Patented Sept. 14, 1948

2,449,286

UNITED STATES PATENT OFFICE 2,449,286

PRODUCTION OF 1,3-DIHALOPROPYLENES

Alasdair W. Fairbairn, Berkeley, Calif., assignor to Shell Development Company, San Francisco, Calif., a corporation of Delaware No Drawing. Application July 16, 1945,
Serial No. 605,453

9 Claims. (Cl. 260—654)

The present invention relates to the production of 1,3-dihalopropylenes, and more particularly pertains to the production of 1,3-dihalopropylene as well as of mixtures containing it and other saturated and unsaturated polychlorinated hydrocarbons containing three carbon atoms per molecule.

Dihalopropylenes, and particularly propylenes containing a halogen atom on each of the terminal carbon atoms, are highly valuable compounds which find a variety of uses in different industries. For instance, it has been recently discovered that terminally halogenated propylenes such as 1,3-dihalopropene-1, as well as mixtures containing these halogenated propylenes and other halogenated saturated and unsaturated hydrocarbons of three to six carbon atoms, are highly effective agents for fumigating and disinfecting soils, and particularly for the control of nematodes. The 1,3-dihalopropylenes, and particularly 1,3-dichloropropene-1, as well as mixtures thereof with other polyhalogenated hydrocarbons, preferably those containing three to six carbon atoms per molecule, combine high toxicity to soil pests with low phytocidal action. These agents are highly effective in controlling nematodes as well as other soil pests and insects and, in the required concentrations, are relatively non-injurious to plants either directly or through deleterious action upon the physical properties of the soil. The 1,3-dihalopropylenes and mixtures containing these unsaturated halogenated hydrocarbons also possess optimum spreading and penetrating properties due to their volatility range and vapor pressure at ordinary soil temperatures, and are relatively safe to handle.

It has now been discovered that 1,3-dihalopropylenes, as well as mixtures containing high concentrations of the 1,3-dihalopropylenes and other polyhalogenated hydrocarbons having three carbon atoms per molecule, may be readily produced by subjecting 1,2-dihalopropane, together with the corresponding free halogen, to elevated temperatures. For the purpose of a clear understanding of the present invention, the process will be described in connection with the treatment of 1,2-dichloropropane to produce 1,3-dichloropropene-1 and mixtures containing it, it being understood however that the invention is not limited to the production of the specified chlorinated compounds since the other 1,2-dihalopropanes may be likewise treated to produce the corresponding 1,3-dihalopropylenes, e. g. 1,3-dibromopropene-1.

In order to produce 1,3-dichloropropene-1 in accordance with the process of the invention, 1,2-dichloropropane which has been preferably preheated is thoroughly mixed with chlorine in amounts set forth hereinbelow, the mixture being then subjected to an elevated temperature within the range of 300° C. to 800° C. and preferably between about 400° C. and about 600 C. for a period of time sufficient to effect the conversion of a substantial amount of the 1,2-dichloropropane to 1,3-dichloropropene-1, the reaction time being correlated with the reaction temperature so as to avoid substantial formation of carbon and of compounds containing less than three carbon atoms per molecule. The process of the present invention is not a simple dehydrogenation of the 1,2-dichloropropane, since ordinary dehydrogenation would produce 1,2-dichloropropene-2 and not 1,3-dichloropropene-1. It is possible that the treatment of the starting material in accordance with the process of the present invention results in the removal of a hydrogen atom from the carbon atom free from any attached halogen atoms, this reaction being followed by or occurring simultaneously with an isomerization or rearrangement in which the halogen atom attached to the secondary carbon atom is transferred to the terminal carbon atom from which the hydrogen atom has been removed. It is also possible that the conversion of 1,2-dichloropropane to 1,3-dichloropropene-1 is more complicated and involves dehydrochlorination and chlor-substitution, or dehydrochlorination, dehydrogenation and chlorination. Whatever may be the case the treatment of 1,2-dihalopropanes, and specifically 1,2-dichloropropane, in accordance with the present process results in the conversion of the starting material to 1,3-dihalopropene-1 or at least mixtures containing high percentages of this desired and valuable halogenated unsaturated compound.

In a great majority of cases the conversion of the 1,2-dihalopropanes to the corresponding 1,3-dihalopropylenes does not occur to any substantial extent at temperatures below 300° C. The process is preferably executed at temperatures at least equal to 400° C. The upper limit of the preferred operating temperature range is determined in part by the specific 1,2-dihalopropane treated, and the time during which the reactants, namely the 1,2-dihalopropane and the corresponding free halogen, are subjected to the operating temperature. For example, when optimum practical yields are desired, the operating temperature should be below that at which, under the prevailing conditions of contact time, pressure, molar ratio of the reactants, degree of dilution if any, etc., degradation reactions such as cracking, polymerization and the like are favored. Generally, operating temperatures of from about 300° C. to about 800° C. are suitable, although the preferred range is between about 400° C. and about 600° C.

In order to bring the mixture to the desired temperature one or more of the reactants may also be heated before or during the mixing. For instance, the 1,2-dichloropropane may be heated alone to a temperature of about 300° C. to about 350° C. and then mixed with the unheated chlorine. Also, the chlorine may be first preheated and then mixed with the unheated 1,2-dichloropropane. In the alternative, both reactants may be heated before or during mixing. The heating of the reactants or of mixtures thereof may be effected indirectly as by conveying either or both of them through externally heated tubes, or directly as by introducing heated inert gases, e. g. nitrogen, steam and the like, into the reactant or reactants to be preheated. The preheating is generally effected to a temperature such that the reactants are readily brought to the reaction temperature in the reaction zone. By a suitable selection of preheating conditions, it is also possible to realize the reaction adiabatically.

The reaction may be effected with either the halogen or the 1,2-dihalopropane in excess, or with the reactants in equimolecular amounts. Generally it is preferable to employ an excess of the 1,2-dihalopropane because in such cases the yield of the desired product or products based on the applied halogen is usually better and the temperature control is facilitated. Although mixtures containing a slight molar excess of the 1,2-dihalopropane have been successfully used, and although it is possible to employ the 1,2-dihalopropane and the corresponding halogen in mole ratios of up to about 3:1 or even higher, it is also possible to employ an excess of the halogen. However, if the amount of halogen is too high, for instance with halogen to 1,2-dihalopropane ratios of 2:1 and higher, the formation of decomposition products having a lesser number of carbon atoms per molecule as well as of carbon becomes more and more preponderant. On the other hand, if the amount of halogen is too low the conversion per pass becomes uneconomical.

The course of the reaction may be influenced to a marked extent by using different pressures as well as by employing gaseous or vaporous inert diluents or by varying the rate of flow of the reactants through the reaction zone. It was already stated that the suitable reaction temperature depends in part on the contact time and, vice versa, the proper residence time in the reaction zone depends in part on the reaction temperature used. Other conditions being equal, excessively high throughputs which necessitate very short contact times will result in the lowering of rates of conversion, while long contact periods will cause excessive degradation of the 1,2-dihalopropane employed and/or of the product, with the resultant formation of large amounts of carbon and other undesirable byproducts. The reaction tube or reaction chamber may be of any suitable material, e. g. carbon, steel, nickel, quartz, Hastelloy, and Monel metal reaction tubes. If desired, the rate of conversion of the 1,2-dihalopropane to the corresponding 1,3-dihalopropylene may be accelerated by the use of light and/or catalysts such as carbon, antimony halides, stannic halides, and the like. Other conditions being the same, the use of these and like accelerating agents may permit the execution of the reaction at lower temperatures.

Although the reaction may be effected in the liquid phase by employing suitably high pressures, it is preferable to conduct the conversion of the 1,2-dihalopropanes to the corresponding 1,3-dihalopropylenes, or mixtures containing these compounds as well as other polyhalogenated hydrocarbons having three carbon atoms per molecule, in the vapor phase. The reactants, namely the 1,2-dihalopropane and the necessary or optimum amount of halogen, may be all introduced at the inlet to the reaction zone so that both reactants are caused to pass throughout the length of said zone. In the alternative, all of the 1,2-dihalopropane may be injected at the inlet to such zone while the halogen, which may or may not be preheated, may be split into several streams and fed into the zone at various intermediate points thereof. Also, the reaction may be carried out by supplying the amount of halogen necessary for the desired conversion through suitable distributors or mixing devices in one or more stages which are separated from each other by reaction zones. Such a procedure makes it possible to control the reaction on a technical scale by proportioning the amounts of the halogen and by regulating the temperatures in the reaction zone or zones. Generally, by adding the halogen in stages the reaction is subdivided and the course of the reaction is rendered milder. The reaction temperature in each of the zones, if more than one reaction zone is employed, may be identical or different. If desired or found necessary, intermediate heating or cooling of the reaction mixtures may also be resorted to.

Although unnecessary, it is sometimes preferable to treat the reaction mixture, substantially immediately after it leaves the reaction zone, to separate from such reaction mixture the hydrogen halide formed as a byproduct. The separation of the hydrogen halide may be effected in a variety of suitable manners. The reaction mixture may be contacted with a suitable selective solvent for the hydrogen halide, such as water, in a conventional scrubber, and the hydrogen halide absorbed and separated from the reaction product. Alternatively, the reaction mixture may be subjected to liquefaction immediately after it leaves the reaction zone, with or without a previous neutralization treatment with a suitable base such as caustic alkali solution. If it is desired to remove the last traces of hydrogen halide, this may be accomplished in a known manner by treatment with solid alkalies or by distillation procedure. The remaining saturated and unsaturated halogenated compounds may be treated in any known manner, e. g. by distillation, to remove the various constituents or any mixtures thereof.

It was stated that the 1,3-dihalopropylenes, particularly 1,3-dichloropropene-1, is highly suitable as a nematocide. It was also stated that polychlorinated mixtures containing 1,3-dichloropropene-1 and other saturated and unsaturated polychlorinated hydrocarbons containing three carbon atoms per molecule are highly effective as agents for fumigating and disinfecting soils. When the reaction product is to be used for this purpose it is preferred to subject the mixture, after a preliminary separation of any unreacted chlorine and of the hydrogen chloride, to a distillation to separate the monochlorinated hydrocarbons which generally boil below about 70° C.

The remaining fraction, containing the unconverted 1,2-dichloropropane, the unsaturated dichloropropylenes and the trichloro compounds with or without the higher boiling compounds which generally boil above about 145° C., may then be employed as such or in connection or combination with other organic compounds such as hydrocarbons.

The invention is illustrated by the following example, it being understood that the example is presented for purposes of illustrating a preferred embodiment since the invention is not to be considered as being limited by or restricted to this example.

*Example*

1,2-dichloropropane was preheated to a temperature of about 320° C. and mixed with chlorine in a mixing jet in a mole ratio of 1.27 moles of the organic chloride per mole of chlorine. The mixture was then introduced at a rate of about 14.8 moles per hour into a reactor having a volume of 230 cc. The reaction temperature was about 500° C. The apparent contact time of the reactants in the reaction zone was equal to about 0.88 second, the reactants being maintained at the maximum temperature of 500° C. for an estimated period of 0.80 second.

The run was conducted for three hours, during which time approximately 4220 g. of reactants were thus conveyed through the reactor. The reaction products leaving the reactor were washed with water to remove the hydrogen chloride formed as a byproduct. An analysis of the reaction products showed that approximately 1.5% of the introduced chlorine remained unreacted. The yield of hydrogen chloride was equal to 2.0 moles per mole of chlorine fed. Approximately 80% of the 1,2-dichloropropane reacted to produce organic chlorides. Of the organic chlorides in the reaction mixture, about 9% constituted the light ends boiling below about 70° C. Of these, about 45% was allyl chloride, 45% was beta-chloropropylene, and approximately 10% was alpha-chloropropylene. The remaining higher boiling organic fraction analyzed as follows:

| | Percent |
|---|---|
| Saturated dichlorides | 22 |
| Unsaturated dichlorides | 42 |
| Unsaturated trichlorides | 21 |
| Higher boiling compounds (boiling above 145° C.) | 15 |

71% of the unsaturated dichloride fraction consisted of 1,3-dichloroprepene-1 the remainder being 2,3- and 3,3-dichloropropene-1. As to the unsaturated trichlorides, approximately 80% consisted of 1,3,3-trichloropropene-1. Very little carbon was formed during the reaction, the carbon formation being equal to 0.035 gram per gram of 1,2-dichloropropane introduced into the reaction.

In a similar manner a polybrominated fraction is obtained when substantially equimolar amounts of 1,2-dibromopropane and bromine are subjected to the reaction described above. The reaction product contains substantial amounts of 1,3-dibromopropene-1.

Instead of using a halogen which is identical with that of the dihalopropane employed, it is possible to use a different halogen. For instance, by subjecting 1,2-dibromopropane with chlorine to the above-mentioned reaction it is possible to produce a fraction containing a 1,3-dihalopropene-1 in which one of the halogens is a chlorine while the other is a bromine.

I claim as my invention:

1. A continuous process for the production of 1,3-dichloropropylene which comprises mixing 1,2-dichloropropane with chlorine in a mole ratio of between 1:1 and 3:1, continuously conveying said mixture through a reaction zone, maintaining said mixture in said reaction zone at a temperature of about 500° C. for a fraction of a second, thereby producing a reaction mixture containing 1,3-dichloropropylene and recovering the latter.

2. A process for the production of 1,3-dichloropropylene which comprises mixing chlorine with 1,2-dichloropropane in a mole ratio of between 1:1 and 3:1 and subjecting said mixture to a temperature of about 500° C. for a period of time sufficient to convert a substantial portion of the 1,2-dichloropropane to dichloropropylenes predominating in 1,3-dichloropropylene and recovering the latter.

3. In a process for the production of 1,3-dichloropropylene the steps of mixing 1,2-dichloropropane with chlorine in a mole ratio of between about 1:1 and about 3:1, subjecting said mixture to a temperature of about 500° C. for a period of time sufficient to convert a substantial portion of the 1,2-dichloropropane to 1,3-dichloropropylene and recovering said 1,3-dichloropropylene from the reaction mixture.

4. In a process for the production of 1,3-dichloropropylene the steps of mixing 1,2-dichloropropane with chlorine in a mole ratio of between about 1:1 and about 3:1, subjecting said mixture to a temperature of between about 400° C. and about 600° C. for a period of time sufficient to convert a substantial portion of the 1,2-dichloropropane to 1,3-dichloropropylene and recovering said 1,3-dichloropropylene propylenes from the reaction mixture.

5. In a process for the production of 1,3-dichloropropylene the steps of mixing 1,2-dichloropropane with chlorine in a mole ratio of between about 1:1 and about 3:1, and subjecting said mixture to a temperature of between about 400° C. and about 800° C., thereby producing substantial amounts of 1,3-dichloropropylene.

6. The process according to claim 5 wherein the reaction product is subjected to distillation to recover the 1,3-dichloropropylene.

7. In a process for the production of 1,3-dihalopropylene the steps of mixing 1,2-dihalopropane with the corresponding halogen in a mole ratio of between about 1:1 and about 3:1, and subjecting said mixture to a temperature of between about 400° C. and about 800° C., thereby producing substantial amounts of 1,3-dihalopropylenes.

8. In a process for the production of 1,3-dihalopropylene the steps of mixing 1,2-dihalopropane with the corresponding halogen in a mole ratio of between 1:1 and 3:1 and subjecting said mixture to a temperature of between about 400° C. and about 800° C. for a period of time sufficient to convert a substantial proportion of the 1,2-dihalopropane to 1,3-dihalogenated propylenes but insufficient to effect substantial degradation of the carbon structures of the molecules.

9. A process for the production of a 1,3-dihalopropylene which comprises heating a 1,2-dihalopropane and a halogen in a mole ratio of between 1:1 and 3:1 to a temperature between 400° C. and 800° C. correlated with a reaction pressure between normal atmospheric and the liquefaction pressure of the reactants at the temperature employed, and with a period of time the reactants are in the reactor, so that a substantial portion of the 1,2-dihalopropane is converted to a 1,3-dihalopropylene in the substantial absence of degradation.

ALASDAIR W. FAIRBAIRN.

REFERENCES CITED

The following references are of record in the file of this patent:

UNITED STATES PATENTS

| Number | Name | Date |
|---|---|---|
| 2,140,548 | Reilly | Dec. 20, 1938 |
| 2,259,195 | Baehr | Oct. 14, 1941 |
| 2,378,859 | Mugdan | June 19, 1945 |

FOREIGN PATENTS

| Number | Country | Date |
|---|---|---|
| 495,900 | Great Britain | Nov. 22, 1938 |

OTHER REFERENCES

McBee et al., Ind. Eng. Chem., vol. 33, 176–181 (1941).

Klebanskii et al., Jour. Applied Chem. (U. S. S. R.), vol. 8, 106–16 (1935).